United States Patent Office

3,337,347
Patented Aug. 22, 1967

3,337,347
BASIC ALKALI METAL ALUMINUM
PHOSPHATE CHEESE EMULSIFIER
Thomas P. Kichline, Chesterfield, Mo., and Norman Earl Stahlheber, Columbia, and James L. Vetter, Des Plaines, Ill., assignors to Monsanto Company, a corporation of Delaware
No Drawing. Filed Oct. 24, 1963, Ser. No. 318,509
7 Claims. (Cl. 99—117)

This invention relates to compositions which are useful as cheese emulsifiers, processes for preparing the same, and to cheese formulations containing the same. More particularly, this invention relates to alkali metal aluminum phosphate compositions of relatively high aluminum content.

Many phosphate materials are known as cheese emulsifiers for process cheese, such as disodium orthophosphate, trisodium orthophosphate, sodium hexametaphosphate, and the like. However, these materials all have serious limitations as cheese emulsifiers and therefore are not used to the extent desired for cheese emulsification. For example, disodium orthophosphate is generally satisfactory as a cheese emulsifier below about 1.6% (based on the total weight of cheese) but when used in greater amounts crystals of disodium orthophosphate usually form which is, of course, highly objectionable. Recently, crystalline sodium aluminum phosphates have been suggested as being useful for cheese emulsification (U.S. Patent 3,097,949) with the particular advantage of not having the tendency to crystallize when used in levels up to about 3%. These phosphate materials are, in general, low in aluminum content and have the empirical formula

$$xNa_2O \cdot yAl_2O_3 \cdot 8P_2O_5 \cdot zH_2O$$

with $x$ being a number between 6 and 15, $y$ a number between 1.5 and 4.5, and $z$ a number between 4 and 40. Additionally, these materials are comprised of an "insoluble" aluminum-containing phosphate material and a soluble sodium phosphate material. As disclosed, the sodium aluminum phosphate materials having the highest aluminum content will normally produce the highest ratios of "insoluble" material to soluble material (up to about 2:1). This is, of course, in accordance with the findings that the soluble fraction is composed of an intimate mixture of two or more sodium orthophosphates, while the "insoluble" fraction is the aluminum-containing fraction.

It has now been found in accordance with the present invention that an entirely new and distinct class of alkali metal aluminum phosphate compositions of relatively high aluminum content can be prepared. A highly unexpected and surprising characteristic of these compositions is that although relatively high in aluminum content they have a relatively high ratio of soluble fractions to insoluble fractions. In fact, the ratio of soluble fractions to insoluble fractions is at least equal to and in most cases higher than ratio of soluble fractions to insoluble fractions of the sodium aluminum phosphate materials of relatively low aluminum content as previously described. These new phosphate compositions of relatively high aluminum content have for use as cheese emulsifiers the recognized advantages of the sodium aluminum phosphates as previously described and in addition impart other useful and highly beneficial properties to the cheese, all of which will be more fully discussed hereinafter.

The alkali metal aluminum phosphate compositions of the present invention can be characterized by the following empirical formula

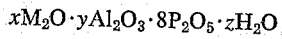
$$xM_2O \cdot yAl_2O_3 \cdot 8P_2O_5 \cdot zH_2O$$

wherein M represents alkali metal, x is a number between 5 and 30 inclusive, $y$ is a number between 4.7 and 15.0 inclusive, and $z$ is a number between 0 and 50 inclusive. Especially preferred are those compositions wherein $x$ is a number between 10 and 20 inclusive, $y$ is a number between 4.7 and 10 inclusive, and $z$ is a number between 15 and 30 inclusive. In addition, the preferred compositions are substantially amorphous, i.e., an X-ray pattern exhibits no characteristic lines and if lines are present they are usually those characteristic for dialkali metal orthophosphate, and/or trialkali metal orthophosphate. It should be noted, however, that these compositions can be formed in the crystalline state and although the crystalline forms are useful as cheese emulsifiers they do not appear, in general, to exhibit the advantageous properties as cheese emulsifiers that the amorphous forms of the compositions exhibit. In addition, the water as indicated in the foregoing formula should not necessarily be taken as representing water of crystallization since thermal gravimetric analysis indicates that the water is lost gradually when the compositions are heated to temperatures between about 80° C. and about 500° C. and there is usually no clearly defined break such as would be present in the case of free water or a crystalline hydrate. Further, these alkali metal aluminum phosphate compositions are alkaline in nature in that the pH of a 2% by weight aqueous slurry at about 25° C. is between about 7 and about 10. Additionally, the insoluble fraction, i.e., the residue remaining from a 5% aqueous slurry of the alkali metal aluminum phosphate compositions at about 25° C. after the slurry has been agitated for about 10 minutes and filtered through a No. 2 filter paper, is usually less than about 65 weight percent of the alkali metal aluminum phosphate compositions and preferably is less than about 50 weight percent, although the insoluble fraction is rarely, if ever, less than about 5 weight percent. Thus, the soluble fraction contained in the alkali metal aluminum phosphate compositions are greater than about 35 weight percent of the alkali metal phosphate compositions and preferably greater than about 50 weight percent, although the soluble fraction is rarely, if ever, greater than about 95 weight percent. The alkali metal aluminum phosphate compositions which make up the insoluble fraction can be characterized by the following empirical formula

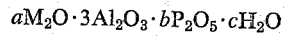
$$aM_2O \cdot 3Al_2O_3 \cdot bP_2O_5 \cdot cH_2O$$

wherein M represents alkali metal, $a$ is a number between 0.5 and 5 inclusive, $b$ is a number between 0.5 and 2.4 inclusive, and $c$ is a number between 0 and 40 inclusive.

Although all of the alkali metal aluminum phosphate compositions of the present invention are, in general, suitable for use as cheese emulsifiers, such as the lithium-, sodium-, potassium-, and cesium aluminum phosphates and also the ammonium aluminum phosphates, as well as the mixed alkali metal aluminum phosphates, it is preferred that the alkali metal be sodium, potassium, ammonium and mixtures of these with sodium being especially preferred. Ammonia is included herein as an alkali metal in view of the fact that the ammonium aluminum phosphates exhibit substantially the same chemical properties as the alkali metal aluminum phosphates, such as the sodium aluminum phosphates and the potassium aluminum phosphates.

Compositions of the present invention can be prepared in many different ways, however a preferred method for producing the compositions, in general, comprises reacting an alkali metal material, an aluminum containing material, and a phosphorus containing material. In particular, the alkali metal materials which are suitable include the alkali metal oxides, the alkali metal hydroxides, and the alkali metal orthophosphates, such as the monoalkali metal-, dialkali metal-, and the trialkali metal-orthophosphates, including mixtures thereof. In addition, the aluminum containing materials which are suitable include aluminum oxide, aluminum hydroxide, and the alkali metal aluminates including mixtures thereof. Further, the phosphorus containing materials include the alkali metal orthophosphates and orthophosphoric acid including mixtures thereof. When orthophosphoric acid is used, it is preferably concentrated, i.e., containing above about 50% $H_3PO_4$ by weight. In general, the reactants are admixed in any order and, if necessary, water is added in sufficient amounts to provide a suitable reaction medium with the reaction preferably conducted under agitation. The reaction is usually exothermic and the temperature, depending upon the amount of water used, if any, reactants used and the like, can reach as high as about 70° C. to about 120° C., although it is generally preferred to keep the temperature below about 100° C. Again, depending upon the reactants and the reacting conditions used, an amount of water can be added which will give, because the reaction is exothermic, a relatively dry, pulverulent reaction product. In cases where excess water is used, the reaction products can usually be dried to a dry, particulate state by various means in order to remove the water, such as by drum drying. While it is preferred that sufficient water be present to give a slurry concentration of at least about 90% solids by weight, it is rarely necessary, if ever, to use a slurry concentration of less than about 20% solids by weight. The amounts of alkali metal materials, aluminum containing materials, and the phosphorus containing materials are selected in such a manner as will give the desired amounts of alkali metal, aluminum, and phosphorus in the reaction product. The preferred reactants for preparing the alkali metal aluminum phosphate composition of the present invention are the alkali metal orthophosphates and the alkali metal aluminates, with the monoalkali metal orthophosphates being especially preferred.

As previously mentioned, the alkali metal aluminum phosphate compositions of the present invention, although of relatively high aluminum content, have a relatively high ratio of soluble fraction to insoluble fraction. This soluble fraction, comprised of dialkali metal orthophosphates, trialkali metal orthophosphates, and mixtures of these, is, in fact, at least equal to and in most cases greater than the soluble fraction found in sodium aluminum phosphates of low aluminum content. This is, of course, totally unexpected in view of the fact that the insoluble fraction is the aluminum containing phosphate composition. For example, a sodium aluminum phosphate material of low aluminum content and having an empirical formula as disclosed in U.S. Patent 3,097,949 was compared as to the soluble fraction content therein with representative sodium aluminum phosphates of the present invention. The comparison was made on equal weight samples by water extraction with the extraction carried out at room temperature, i.e., about 25° C., in a 5% slurry of the sodium aluminum phosphate material and water after being agitated for 10 minutes and filtered through a No. 2 filter paper. The solution was analyzed for sodium and phosphorus concentration, and the filtrate residue was analyzed for sodium, aluminum and phosphorus. The following are the results of the comparison on a weight percentage basis:

TABLE 1.—SODIUM ALUMINUM PHOSPHATE COMPOSITION

| | $Na_2O$ (percent) | $Al_2O_3$ (percent) | $P_2O_5$ (percent) |
|---|---|---|---|
| 1 | 39.2 | 13.8 | 47.2 |
| 2 | 36.4 | 17.5 | 46.4 |
| 3 | 33.3 | 23.4 | 43.5 |
| 4 | 30.2 | 24.5 | 45.3 |

SOLUTION ANALYZES: WEIGHT PERCENT OF ANHYDROUS DISODIUM ORTHOPHOSPHATE

| | $Na_2HPO_4$ (percent) | $Al_2O_3$ (percent) | $P_2O_5$ (percent) |
|---|---|---|---|
| 1 | 27.3 | | |
| 2 | 54.4 | | |
| 3 | 52.8 | | |
| 4 | 37.8 | | |

RESIDUE COMPOSITION

| | $Na_2O$ (percent) | $Al_2O_3$ (percent) | $P_2O_5$ (percent) |
|---|---|---|---|
| 1 | 36.4 | 19.4 | 44.2 |
| 2 | 18.8 | 44.9 | 36.3 |
| 3 | 15.2 | 53.0 | 31.8 |
| 4 | 19.2 | 41.8 | 39.0 |

From the above table it can be observed that the compositions representative of the sodium aluminum phosphates of the present invention (designated as 2, 3 and 4) exhibited a much higher ratio of soluble fraction to insoluble fraction than the composition of relatively low aluminum content and having an empirical formula as disclosed in U.S. Patent 3,097,949 (designated as 1). This is clearly and dramatically illustrated by the fact that although the sodium and phosphorus contents of composition 1 were extracted in amounts of about 27.3% on an anhydrous disodium orthophosphate basis, the sodium and phosphorus content of compositions 2, 3 and 4 were extracted between about 37.8% and 54.4% on an anhydrous disodium orthophosphate basis.

The process cheese formulations of the instant invention, i.e., one or more cheese stocks and emulsifiers, can be prepared by mixing, preferably with the aid of heat, one or more cheese stocks and, as an emulsifier, the alkali metal aluminum phosphate compositions of the instant invention. Any cheese stock, in general, is suitable for use and can be natural cheeses, such as American, Swiss, Brick, Cheddar, Limburger, Gouda, Edam, Camembert, Gruyere, Blue, Muenster, and the like, as well as cheese foods and cheese spreads including the imitation cheese spreads which usually contain certain vegetable gums. Depending upon the particular cheese stocks and/or cheese stock blends employed, the alkali metal aluminum phosphate compositions can be used in amounts up to about 20% by weight and as low as 0.1% by weight of the total cheese composition, with amounts between about 1.5% to about 3% by weight being preferred. In addition, in some instances, the alkali metal aluminum phosphate compositions of the instant invention and particularly the sodium aluminum phosphate compositions can be used in conjunction with other cheese emulsifiers, such as disodium orthophosphate, trisodium orthophosphate, sodium citrates, and the like, including mixtures thereof. In particular, a preferred process cheese formulation contains between about 1.5% to about 2.5% by weight of sodium aluminum phosphate composition and about 0.5% to about 1.5% of disodium orthophosphate, trisodium orthophosphate, and sodium citrate including mixtures of these. These preferred cheese formulations have been found to be extremely good in every characteristic which can be reasonably expected of such cheese formulations.

In general, the cheese formulations can be prepared by admixing the cheese stocks and/or cheese stock blends with emulsifiers in such a manner as to thoroughly blend the additives. Usually heat is necessary in order to be able to sufficiently work the cheese stocks and, in general, temperatures between about 120° F. to 200° F. are suitable. In some cases it is advantageous to incorporate the cheese emulsifier of the present invention in the cheese stock and/or cheese stock blends while the cheese is being prepared in its curd form before drying, although, in general, it is preferred to blend the emulsifier with the cheese stock and/or cheese stock blends after the cheese has been prepared and cured to a suitable degree.

The alkali metal aluminum phosphate compositions and especially the preferred sodium aluminum phosphate compositions impart to the cheese stocks not only emulsifying properties, i.e., preventing or minimizing oil separation from the cheese stocks especially when heated, but also such advantageous properties as exhibiting no tendency to crystallize, improving the development of melt, i.e., the ability of the cheese to melt without oil separation, so that little or no curing period is required, and exhibiting the ability to raise the pH of a cheese to the desired level for process cheese formulations which is usually between about 5.5 to about 6. Equally as important, the cheese emulsifiers of the present invention exhibit, as cheese emulsifiers, other advantageous properties which are not believed to be found in conventional cheese emulsifiers, such as their ability to be used in a wide variety of cheese stocks having various ages and pH's as well as various cheese stock blends which enables the cheese manufacturer to formulate and prepare process cheese formulations without any unnecessary processing and/or blending of the cheese stocks. In addition, the cheese emulsifiers of the present invention impart to pre-cut sliced process cheese formulations the distinct and important advantage of permitting better and easier separation of the slices which is often, in the case of such cheese, the deciding factor in the consumers preference. In addition, the preferred sodium aluminum phosphate compositions, that is, the substantially amorphous sodium aluminum phosphate compositions are, in general, excellent cheese emulsifiers, especially from the standpoint of the highly objectionable feature of crystal formation, since these compositions are substantially amorphous and do not exhibit the tendency to form crystals even under stringent conditions of use. As can be appreciated, therefore, the process cheese formulation having incorporated therein the cheese emulsifiers of the present invention are superior cheese formulations for many and various reasons.

In the following examples, compositions of the present invention are used as cheese emulsifiers in process cheeses of various stocks. In general, process cheese formulations are prepared by adding ground cheese stock, about 364 grams, and the cheese emulsifiers, amounts as indicated in the following examples, to a mixing bowl used with a Hobart C–100 mixer. The mixing bowl is equipped with a steam injection system for uniform heating of the cheese formulation. The cheese and the additives are mixed under steam injection for about 2.5 minutes and an additional period of time of about 1.0 minute with no steam injection. The rate of steam injection is adjusted so that the final cheese temperature is about 160° F. The cheese formulation is then placed into suitable molds and allowed to cool to room temperature. In the preparation of pre-cut sliced cheese formulations, the slices are prepared by cooling the hot process cheese formulation in a suitable mold which gives the cheese the form of a 1/8 inch thick sheet. After cooling to room temperature, the cheese formulation sheet is cut into 3.5 inch square slices, stacked and packaged. The evaluation of pre-cut slices is considered important for the evaluation of cheese emulsifiers for the following reasons:

(1) The effect of the cheese emulsifier on cheese viscosity can be tested, which can indicate the ease of handling during the slicing operation.

(2) The effect of the cheese emulsifier on the brittleness of ribbons of process cheese can be tested.

(3) The effect of the cheese emulsifier on crystal formation can be studied under more adverse and realistic conditions.

(4) The effect of the cheese emulsifier on the separation of slices can be studied.

The evaluation is based upon samples which are held at about 34° F. for about 6–30 days except for the crystal formation which is based upon samples held at 34° F. for at least about 3 weeks. All measurements except pH determination are subjective measurements made on a 0–3 scale with 0 being extremely poor and 3.0 being excellent. The separation test is conducted on pre-cut sliced samples by manually separating the slices with the rating indicating the ease of separation. The breaking characteristics of the cheese compositions are measured by bending slices of cheese and observing the type of break obtained. A straight clean break is considered good; a jagged course break or a tacky break is considered poor. The grain characteristic is observed during the break test and is a measure of the smoothness of grain. The melting characteristics are conducted on small cylinders of the cheese compositions, 1/4 inch thick and 7/8 inch diameter, after the cylinder samples have been heated for about 10 minutes above a boiling water bath. After heating, the cylinder samples are immediately placed in a freezer for cooling and to prevent further change. The melts are then evaluated for oiling and texture. The oiling characteristic is the degree of separation of oil and is observed and reported on the basis of 0–3 scale, the higher rating indicating little or no oil separation. The texture characteristics are rated with smooth, even melts give a high rating and curdled, uneven melts give low ratings. The pH of the cheese is measured directly with a pH meter after the sample has first been warmed to about 60° C. for easier immersion of the electrodes.

The following examples are presented to illustrate the invention with parts by weight being used in the example unless otherwise indicated.

*Example 1*

Into a suitable reaction vessel are charged about 63.9 parts of monosodium orthophosphate and about 36.1 parts of commercial sodium aluminate of approximately 46% $Al_2O_3$ by weight and a weight ratio of $Na_2O/Al_2O_3$ of 0.65. Enough water is added to give a slurry concentration of about 50 percent solids. The reaction mixture is agitated and an exothermic reaction takes place, usually in a short period of time of about 15 minutes, and the reaction product is drum dried to a relatively dry, particulate composition having the following analysis on an anhydrous molar ratio basis:

$Al_2O_3$ ---------------------------------- 4.84
$Na_2O$ ----------------------------------- 13.2
$P_2O_5$ ----------------------------------- 8.0

This sodium aluminum phosphate composition is incorporated as a cheese emulsifier in cheese stocks on a weight basis of the following types:

(1) Slightly aged cheese stock (about 90 days) having a pH of 5.4

(2) Medium aged cheese stock (about 8 months) having a pH of 5.5.

(3) Aged cheese stock (about 12 months) having a pH of 5.3.

(4) A cheese stock blend of the foregoing 3 cheeses with 50% of 1, 25% of 2, and 25% of 3 on a weight basis.

(5) A cheese stock blend of:
  41.4% slightly aged cheese stocks (1–6 months) having a pH of 5.75.
  20.6% slightly aged cheese stock (1–6 months) having a pH of 5.60.
  31.0% slightly aged cheese stock (1–6 months) having a pH of 5.40.
  7.0% aged cheese stock (about 12 months) having a pH of 5.3.

(6) A cheese blend of:
  50% slightly aged cheese stock (about 2½ months) having a pH of 5.6.
  50% slightly aged cheese stock (about 2 months) having a pH of 5.2.

(7) A cheese blend of:
  33% slightly aged cheese stock (about 2½ months) having a pH of 5.6.
  67% slightly aged cheese stock (about 2 months) having a pH of 5.0.
(8) A cheese blend of:
  67% slightly aged cheese stock (about 2½ months) having a pH of 5.6.
  33% slightly aged cheese stock (about 2 months) having a pH of 5.0.

The following table indicates the results of the tests on the cheeses for the previously described characteristics.

of commercial sodium aluminate as described in Example 1, and about 15.7 parts of orthophosphoric acid (on a 100% $H_3PO_4$ basis). Enough water is added to give a slurry concentration of about 50 percent solids. The reaction mixture is agitated and an exothermic reaction takes place, the reaction product is then recovered and drum dried to a relatively dry, particulate composition having the following analysis on an anhydrous molar ratio basis:

$Al_2O_3$ ---------------------------------------- 5.2
$Na_2O$ ----------------------------------------- 11.2
$P_2O_5$ ----------------------------------------- 8.0

TABLE 2

| Cheese Stock | SAP (percent) | DSP (percent) | TSP (percent) | Mixing | Separation | | Brittleness | Break | Grain | Melting | | pH | Crystals |
|---|---|---|---|---|---|---|---|---|---|---|---|---|---|
| | | | | | Cold | R.T. | | | | Texture | Oil Off | | |
| 1 | 3.0 | | | Good | | | | 2.5 | 2.0 | 3.0 | 3.0 | 5.30 | 1 |
| 2 | 3.0 | | | do | 3.0 | 3.0 | | 2.5 | 2.0 | 3.0 | 3.0 | | 1 |
| 3 | 3.0 | | | do | 2.5 | 2.5 | | 2.5 | 2.5 | 3.0 | 3.0 | | 1 |
| 4 | 3.0 | | | Sl. Stiff | 2.5 | 2.5 | 2.0 | 1.5 | 1.5 | 2.5 | 2.5 | 5.40 | 1 |
| | 2.5 | 0.5 | | do | 2.5 | 2.5 | 2.0 | 2.0 | 2.5 | 2.5 | 3.0 | | 1 |
| | 2.0 | 1.0 | | Stiff | 2.5 | 2.0 | 2.5 | 2.0 | 2.0 | 2.5 | 2.5 | 5.40 | 1 |
| | 2.5 | | 0.5 | Good | 2.5 | 2.5 | 2.5 | 2.5 | 2.5 | 3.0 | 3.0 | 5.60 | 1 |
| | 2.0 | | 1.0 | do | 2.5 | 2.5 | 2.0 | 2.5 | 2.5 | 3.0 | 3.0 | 5.70 | 1 |
| | 2.0 | 0.5 | 0.5 | do | 2.5 | 2.5 | 2.5 | 2.5 | 2.5 | 3.0 | 3.0 | 5.70 | 1 |
| 5 | 3.0 | | | do | | | | 2.0 | 2.0 | 3.0 | 1.5 | 5.30 | 1 |
| | 2.5 | 0.5 | | Sl. Stiff | | | | 2.0 | 2.5 | 3.0 | 1.5 | 5.40 | 1 |
| 6 | 3.0 | | | V.S. Stiff | | | | 2.0 | 2.0 | 3.0 | 3.0 | 5.20 | 1 |
| | 2.5 | 0.5 | | Good | | | | 2.5 | 2.5 | 3.0 | 3.0 | 5.30 | 1 |
| | 2.0 | 1.0 | | do | | | | 2.5 | 2.0 | 3.0 | 3.0 | 5.20 | 1 |
| | 2.5 | | 0.5 | V. Good | | | | 2.5 | 2.5 | 3.0 | 3.0 | 5.50 | 1 |
| | 2.0 | 0.5 | 0.5 | Good | | | | 2.0 | 2.0 | 3.0 | 3.0 | 5.50 | 1 |
| 7 | 3.0 | | | V.S. Stiff | 3.0 | 2.5 | | 2.0 | 1.5 | 2.5 | 3.0 | | 1 |
| 8 | 3.0 | | | Sl. Stiff | 2.5 | 2.5 | | 2.0 | 1.5 | 2.0 | 2.5 | | 1 |

LEGEND: SAP—sodium aluminum phosphate; DSP—disodium orthophosphate; TSP—trisodium orthophosphate; Sl. Stiff—slightly stiff; V.S. Stiff—very slightly stiff; V. Good—very good; Cold—45° F.; R. T.—75° F.; 1—no crystals; 2—crystals.

*Example 2*

The procedure of Example 1 is repeated except that there is employed about 65.7 parts of monosodium orthophosphate and about 34.3 parts of commercial sodium aluminate as described in Example 1. The resulting product has the following composition on an anhydrous molar ratio basis:

$Al_2O_3$ ---------------------------------------- 4.6
$Na_2O$ ----------------------------------------- 12.9
$P_2O_5$ ----------------------------------------- 8.0

This sodium aluminum phosphate material is incorporated as a cheese emulsifier in cheese stocks on a weight basis of the following blend:

50% slightly aged cheese stock (about 90 days) having a pH of 5.4.
25% medium aged cheese stock (about 8 months) having a pH of 5.5.
25% aged cheese stock (about 12 months) having a pH of 5.3.

The following table indicates the results of the tests on the cheeses for the previously described characteristics.

This sodium aluminum phosphate material is incorporated as a cheese emulsifier in cheese stocks of the following types:

(1) Cheese stock blend by weight of:
  50% slightly aged cheese stock (about 90 days) having a pH of 5.4.
  25% medium aged cheese stock (about 8 months) having a pH of 5.5.
  25% aged cheese stock (about 12 months) having a pH of 5.3.
(2) Cheese stock blend by weight of:
  33⅓% slightly aged cheese stock (about 1–6 months) having a pH of 5.4.
  33⅓% slightly aged cheese stock (about 1–6 months) having a pH of 5.7.
  33⅓% slightly aged cheese stock (about 1–6 months) having a pH of 5.3.
(3) Cheese stock blend by weight of:
  20% slightly aged cheese stock (about 2½ months) having a pH of 5.6.

TABLE 3

| SAP (percent) | DSP (percent) | TSP (percent) | Mixing | Separation | | Brittleness | Break | Grain | Melting | | pH | Crystals |
|---|---|---|---|---|---|---|---|---|---|---|---|---|
| | | | | Cold | R.T. | | | | Texture | Oil Off | | |
| 3.0 | | | Good | 2.5 | 2.5 | 2.0 | 2.0 | 2.0 | 2.5 | 2.5 | 5.60 | 1 |
| 2.5 | 0.5 | | do | 2.5 | 2.5 | 2.5 | 2.0 | 2.0 | 3.0 | 3.0 | 5.55 | 1 |
| 2.0 | 1.0 | | do | 2.5 | 2.5 | 2.0 | 2.0 | 2.5 | 3.0 | 3.0 | | 1 |
| 2.5 | | 0.5 | do | 2.5 | 2.5 | 2.5 | 2.5 | 2.5 | 3.0 | 3.0 | 5.60 | 1 |
| 2.0 | | 1.0 | do | 2.5 | 2.5 | 3.0 | 2.5 | 2.5 | 3.0 | 3.0 | 5.90 | 1 |
| 2.0 | 0.5 | 0.5 | do | 2.5 | 2.5 | 2.5 | 2.0 | 2.5 | 3.0 | 3.0 | 5.90 | 1 |

LEGEND: SAP—sodium aluminum phosphate; DSP—disodium orthophosphate; TSP—trisodium orthophosphate; Cold—45° F.; R.T.—75° F.; 1—no crystals; 2—crystals.

*Example 3*

In a suitable reaction vessel are charged about 45.1 parts of monosodium orthophosphate, about 39.2 parts 80% slightly aged cheese stock (about 2 months) having a pH of 5.0.

The following table indicates the results of the tests on the cheeses for the previously described characteristics.

TABLE 4

| Cheese Stock | SAP (percent) | DSP (percent) | TSP (percent) | Mixing | Separation Cold | Separation R.T. | Brittleness | Break | Grain | Melting Texture | Melting Oil Off | pH | Crystals |
|---|---|---|---|---|---|---|---|---|---|---|---|---|---|
| 1 | 3.0 | ------ | ------ | Good | 2.0 | 2.5 | 1.5 | 2.0 | 1.5 | 2.5 | 2.0 | 5.50 | 1 |
|  | 2.5 | 0.5 | ------ | ----do---- | 2.5 | 2.5 | 2.0 | 2.0 | 2.0 | 2.5 | 2.5 | 5.20 | 1 |
|  | 2.0 | 1.0 | ------ | ----do---- | 2.0 | 2.5 | 1.5 | 2.0 | 2.5 | 3.0 | 3.0 | 5.30 | 1 |
|  | 2.5 | ------ | 0.5 | ----do---- | 2.5 | 2.5 | 2.0 | 2.0 | 1.5 | 3.0 | 3.0 | 5.50 | 1 |
|  | 2.0 | ------ | 1.0 | ----do---- | 2.5 | 2.5 | 2.5 | 2.5 | 2.0 | 3.0 | 3.0 | 6.00 | 1 |
|  | 2.0 | 0.5 | 0.5 | V.S. Stiff | 2.5 | 2.5 | 2.5 | 2.5 | 2.5 | 3.0 | 3.0 | 5.50 | 1 |
| 2 | 2.0 | 1.0 | ------ | ----do---- | 2.0 | 2.5 | 2.0 | 2.5 | 2.5 | 3.0 | 3.0 | 5.20 | 1 |
|  | 2.0 | ------ | 1.0 | Good | 2.5 | 2.0 | 2.5 | 2.5 | 2.5 | 3.0 | 3.0 | 5.90 | 1 |
| 3 | 3.0 | ------ | ------ | Sl. Soft | 2.5 | 2.0 | 2.0 | 2.0 | 2.0 | 2.5 | 3.0 | 5.45 | 1 |
|  | 2.0 | 1.0 | ------ | V.S. Soft | 2.5 | 2.0 | 2.0 | 2.0 | 2.0 | 3.0 | 3.0 | ------ | 1 |
|  | 2.0 | ------ | 1.0 | ----do---- | 2.5 | 1.5 | 3.0 | 2.5 | 2.0 | 3.0 | 3.0 | 5.90 | 1 |

LEGEND: SAP—sodium aluminum phosphate; DSP—disodium orthophosphate; TSP—trisodium orthophosphate; Cold—45° F.; R.T.—75° F.; V.S. Soft—very slightly soft; Sl. Soft—slightly soft; 1—no crystals; 2—crystals.

Example 4

The procedure of Example 3 is repeated except that there is employed about 25.0 parts of monosodium orthophosphate, about 42.8 parts of commercial sodium aluminate as described in Example 1, and about 32.2 parts of orthophosphoric acid (on a 100% $H_3PO_4$ basis). The resulting product has the following compositions on an anhydrous molar ratio basis:

$Al_2O_3$ ---- 5.8
$Na_2O$ ---- 9.35
$P_2O_5$ ---- 8.0

This sodium aluminum phosphate material is incorporated as a cheese emulsifier in cheese stocks of the following types:

(1) Cheese stock blend by weight of:
50% slightly aged cheese stock (about 90 days) having a pH of 5.4.
25% medium aged cheese stock (about 8 months) having a pH of 5.5.
25% aged cheese stock (about 12 months) having a pH of 5.3.

(2) Cheese stock blend by weight of:
33⅓% slightly aged cheese stock (about 6 months) having a pH of 5.35.
33⅓% slightly aged cheese stock (about 6 months) having a pH of 5.1.
33⅓% slightly aged cheese stock (about 6 months) having a pH of 5.2.

(3) Cheese stock blend by weight of:
33⅓% slightly aged cheese stock (about 1–6 months) having a pH of 5.4.
33⅓% slightly aged cheese stock (about 1–6 months) having a pH of 5.7.
33⅓% slightly aged cheese stock (about 1–6 months) having a pH of 5.3.

The following table indicates the results of the tests on the cheeses for the previously described characteristics.

TABLE 5

| Cheese Stock | SAP (percent) | DSP (percent) | TSP (percent) | Mixing | Separation Cold | Separation R.T. | Brittleness | Break | Grain | Melting Texture | Melting Oil Off | pH | Crystals |
|---|---|---|---|---|---|---|---|---|---|---|---|---|---|
| 1 | 2.0 | 1.0 | ------ | V.S. Soft | 1.5 | 2.5 | 1.0 | 1.5 | 1.5 | 2.5 | 2.0 | 5.20 | 1 |
|  | 2.5 | ------ | 0.5 | Good | 1.5 | 1.5 | 1.5 | 2.0 | 1.0 | 2.5 | 2.0 | 5.35 | 1 |
|  | 2.0 | ------ | 1.0 | ----do---- | 2.5 | 2.5 | 2.5 | 2.0 | 2.0 | 3.0 | 3.0 | 5.40 | 1 |
|  | 2.0 | 0.5 | 0.5 | V.S. Soft | 2.0 | 2.5 | 2.0 | 1.5 | 1.5 | 2.5 | 2.5 | 5.40 | 1 |
| 2 | 2.0 | ------ | 1.0 | V.S. Stiff | 2.5 | 2.5 | 2.5 | 2.5 | 1.5 | 2.5 | 2.5 | 5.70 | 1 |
| 3 | 2.0 | ------ | 1.0 | Good | 2.5 | 2.0 | 2.5 | 2.0 | 2.0 | 2.5 | 3.0 | 6.00 | 1 |

LEGEND: SAP—sodium aluminum phosphate; DSP—disodium orthophosphate; TSP—trisodium orthophosphate; V.S. Soft—very slightly soft; V.S. Stiff—very slightly stiff; 1—no crystals; 2—crystals.

Example 5

The procedure of Example 3 is repeated except that there is employed about 45.3 parts of monosodium orthophosphate, about 47.6 parts of commercial sodium aluminate as described in Example 1, and about 7.1 parts of orthophosphoric acid (on a 100% $H_3PO_4$ basis). The resulting product has the following composition on an anhydrous molar ratio basis:

$Al_2O_3$ ---- 7.6
$Na_2O$ ---- 14.9
$P_2O_5$ ---- 8.0

This sodium aluminum phosphate material is incorporated as a cheese emulsifier in cheese stocks on a weight basis of the following type:

50% slightly aged cheese stock (about 90 days) having a pH of 5.4.
25% medium aged cheese stock (about 8 months) having a pH of 5.5
25% aged cheese stock (about 12 months) having a pH of 5.3.

The following table indicates the rseults of the tests on the cheeses for the previously described characteristics.

TABLE 6

| SAP (percent) | DSP (percent) | TSP (percent) | Mixing | Separation | | Brittleness | Break | Grain | Melting | | pH | Crystals |
|---|---|---|---|---|---|---|---|---|---|---|---|---|
| | | | | Cold | R.T. | | | | Texture | Oil Off | | |
| 2.0 | | 1.0 | Good | 2.0 | 2.5 | 2.0 | 2.0 | 1.5 | 3.0 | 2.0 | 6.10 | 1 |
| 2.0 | 0.5 | 0.5 | do | 2.0 | 2.5 | 2.5 | 2.0 | 1.0 | 3.0 | 2.0 | 6.10 | 1 |

LEGEND: SAP—sodium aluminum phosphate; DSP—disodium orthophosphate; TSP—trisodium orthophosphate; Cold—45° F.; R.T.—75° F.; 1—no crystals; 2—crystals.

Example 6

The procedure of Example 3 is repeated except that there is employed about 25.0 parts of monosodium orthophosphate, about 51.5 parts of commercial sodium aluminate as described in Example 1, and about 23.5 parts of orthophosphoric acid (on a 100% $H_3PO_4$ basis). The resulting product has the following composition on an anhydrous molar ratio basis:

$Al_2O_3$ ---------------------------------------- 8.4
$Na_2O$ ----------------------------------------- 12.6
$P_2O_5$ ----------------------------------------- 8.0

This sodium aluminum phosphate material is incorporated as a cheese emulsifier in cheese stocks of the following types:

(1) Cheese stock blend by weight of:
  50% slightly aged cheese stock (about 90 days) having a pH of 5.4.
  25% medium aged cheese stock (about 8 months) having a pH of 5.5.
  25% aged cheese stock (about 12 months) having a pH of 5.3.
(2) Cheese stock blend by weight of:
  33⅓% slightly aged cheese stock (about 6 months) having a pH of 5.35.
  33½% slightly aged cheese stock (about 6 months) having a pH of 5.1.
  33⅓% slightly aged cheese stock (about 6 months) having a pH of 5.2.
(3) Cheese stock blend by weight of:
  33⅓% slightly aged cheese stock (about 1–6 months) having a pH of 5.4.
  33⅓% slightly aged cheese stock (about 1–6 months) having a pH of 5.7.
  33⅓% slightly aged cheese stock (about 1–6 months) having a pH of 5.3.
(4) Cheese stock blend by weight of:
  20% slightly aged cheese stock (about 2½ months) having a pH of 5.6.
  80% slightly aged cheese stock (about 2 months) having a pH of 5.0.

The following table indicates the results of the test on the cheeses for the previously described characteristics.

Example 7

The procedure of Example 3 is repeated except that there is employed about 3.3 parts of monosodium orthophosphate, about 56.1 parts of commercial sodium aluminate as described in Example 1, and about 40.6 parts of orthophosphoric acid (on a 100% $H_3PO_4$ basis). The resulting product has the following composition on an anhydrous molar ratio basis:

$Al_2O_3$ ---------------------------------------- 9.2
$Na_2O$ ----------------------------------------- 10.3
$P_2O_5$ ----------------------------------------- 8.0

This sodium aluminum phosphate material is incorporated as a cheese emulsifier in cheese stocks of the following types:

(1) Cheese stock blend by weight of:
  50% slightly aged cheese stock (about 90 days) having a pH of 5.4.
  25% medium aged cheese stock (about 8 months) having a pH of 5.5.
  25% aged cheese stock (about 12 months) having a pH of 5.3.
(2) Cheese stock blend by weight of:
  33⅓% slightly aged cheese stock (about 6 months) having a pH of 5.35.
  33⅓% slightly aged cheese stock (about 6 months) having a pH of 5.1.
  33⅓% slightly aged cheese stock (about 6 months) having a pH of 5.2.
(3) Cheese stock blend of:
  33⅓% slightly aged cheese stock (about 1–6 months) having a pH of 5.4.
  33⅓% slightly aged cheese stock (about 1–6 months) having a pH of 5.7.
  33⅓% slightly aged cheese stock (about 1–6 months) having a pH of 5.3.
(4) Cheese stock blend by weight of:
  20% slightly aged cheese stock (about 2½ months) having a pH of 5.6.
  80% slightly aged cheese stock (about 2 months) having a pH of 5.0.

TABLE 7

| Cheese Stock | SAP (percent) | DSP (percent) | TSP (percent) | Mixing | Separation | | Brittleness | Break | Grain | Melting | | pH | Crystals |
|---|---|---|---|---|---|---|---|---|---|---|---|---|---|
| | | | | | Cold | R.T. | | | | Texture | Oil Off | | |
| 1 | 2.0 | | 1.0 | Stiff | 2.5 | 2.5 | 2.5 | 2.5 | 1.5 | 3.0 | 2.5 | 5.60 | 1 |
| | 2.0 | 0.5 | 0.5 | Good | 2.5 | 2.5 | 2.0 | 2.0 | 1.5 | 2.5 | 2.5 | 5.60 | 1 |
| 2 | 3.0 | | | Rubbery | 2.0 | 2.5 | 1.0 | 1.0 | 1.0 | 2.0 | 2.0 | 5.60 | 1 |
| | 2.0 | | 1.0 | Good | 2.5 | 2.5 | 2.5 | 1.5 | 1.5 | 2.5 | 2.5 | 6.00 | 1 |
| 3 | 2.0 | | 1.0 | do | 2.0 | 2.5 | 2.0 | 2.0 | 2.5 | 2.5 | 2.5 | 6.10 | 1 |
| 4 | 2.0 | 1.0 | | Sl. Soft | 2.5 | 2.5 | 2.5 | 2.0 | 1.5 | 2.5 | 2.5 | 5.60 | 1 |
| | 2.0 | | 1.0 | V.S. Stiff | 2.5 | 2.5 | 2.5 | 2.5 | 2.0 | 3.0 | 3.0 | 6.10 | 1 |

LEGEND: SAP—sodium aluminum phosphate; DSP—diosodium orthophosphate; TSP—trisodium orthophosphate; Sl. Soft—slightly soft; V.S. Stiff—very slightly stiff; Cold—45° F.; R.T.—75° F.; 1—no crystals; 2—crystals.

The following table indicates the results of the tests on the cheeses for the previously described characteristics.

TABLE 8

| Cheese Stock | SAP (percent) | DSP (percent) | TSP (percent) | Mixing | Separation | | Brittle-ness | Break | Grain | Melting | | pH | Crystals |
|---|---|---|---|---|---|---|---|---|---|---|---|---|---|
| | | | | | Cold | R.T. | | | | Texture | Oil Off | | |
| 1 | 2.5 | | 0.5 | Sl. Stiff | 2.0 | 2.5 | 2.0 | 1.0 | 1.0 | 2.5 | 2.0 | 5.80 | 1 |
|   | 2.0 | | 1.0 | ---- do ---- | 2.0 | 2.5 | 2.0 | 2.0 | 1.5 | 2.5 | 2.5 | ------ | 1 |
| 2 | 2.0 | 0.5 | 0.5 | ---- do ---- | 2.0 | 2.5 | 1.5 | 2.0 | 2.0 | 2.5 | 2.5 | 5.60 | 1 |
|   | 2.0 |     | 1.0 | ---- do ---- | 2.0 | 2.5 | 2.0 | 2.0 | 2.0 | 2.5 | 2.5 | 5.75 | 1 |
| 3 | 2.0 | | 1.0 | Good | 2.5 | 2.0 | 2.5 | 2.5 | 2.0 | 2.5 | 2.5 | 6.20 | 1 |
| 4 | 2.0 | | 1.0 | ---- do ---- | 2.5 | 2.0 | 2.5 | 2.5 | 2.0 | 3.0 | 3.0 | 6.00 | 1 |

LEGEND: SAP—sodium aluminum phosphate; DSP—disodium orthophosphate; TSP—trisodium orthophosphate; Sl. Stiff—slightly stiff; Cold—45° F.; R.T.—75° F.; 1—no crystals; 2—crystals.

Other compositions of the present invention which are suitable for use as cheese emulsifiers and can be prepared from the reaction of alkali metal phosphates and alkali metal aluminates according to the procedure described hereinabove and illustrated by the foregoing examples include potassium aluminum phosphate compositions and ammonium aluminum phosphate compositions as well as mixed sodium-, potassium- and ammonium-aluminum phosphate compositions.

While a process cheese formulation in accordance with this invention need contain only a cheese stock or cheese stock blend of the classes described and, as a cheese emulsifier, an alkali metal aluminum phosphate composition, it will be appreciated that the incorporation in the formulation of additional ingredients such as flavor enhancing additives and the like is contemplated as being within the invention.

What is claimed is:

1. A process cheese formulation comprising cheese and, as an emulsifier, an effective amount of an alkali metal aluminum phosphate composition having the empirical formula $$xM_2O \cdot yAl_2O_3 \cdot 8P_2O_5 \cdot zH_2O$$

wherein M is alkali metal, $x$ is a number between 5 and 30 inclusive, $y$ is a number between 4.7 and 15 inclusive, and $z$ is a number between 0 and 50 inclusive, said alkali metal aluminum phosphate composition further characterized by having a soluble fraction of greater than about 35 weight percent of said composition and selected from the group consisting of dialkali metal orthophosphates, trialkali metal orthophosphates and mixtures thereof, and by the pH of a 2 weight percent aqueous slurry of said composition at about 25° C. being between 7 and 10.

2. The process cheese formulation of claim 1, wherein said alkali metal is selected from the group consisting of sodium, potassium, ammonium and combinations thereof.

3. A process cheese formulation comprising cheese and, as an emulsifier, an effective amount of a substantially amorphous sodium aluminum phosphate composition having the empirical formula $$xNa_2O \cdot yAl_2O_3 \cdot 8P_2O_5 \cdot zH_2O$$

wherein $x$ is a number between 10 and 20 inclusive, $y$ is a number between 4.7 and 10 inclusive, and $z$ is a number between 15 and 30 inclusive, said sodium aluminum phosphate composition further characterized by having a soluble fraction of greater than about 35 weight percent of said composition and selected from the group consisting of disodium orthophosphate, trisodium orthophosphate, and mixtures thereof, and by the pH of a 2 weight percent aqueous slurry of said composition at about 25° C. being between 7 and 10.

4. The process cheese formulation of claim 3, wherein said sodium aluminum phosphate composition is further characterized by having an insoluble fraction having the empirical formula $$aNa_2O \cdot 3Al_2O_3 \cdot bP_2O_5 \cdot cH_2O$$

wherein $a$ is a number between 0.5 and 5.0 inclusive, $b$ is a number between 0.5 and 2.4 inclusive, and $c$ is a number between 0 and 40 inclusive.

5. The process cheese formulation of claim 4, wherein said sodium aluminum phosphate composition has on an anhydrous basis the following elemental oxide molar ratio analysis:

$Al_2O_3$ _____ 5.2
$Na_2O$ _____ 11.2
$P_2O_5$ _____ 8.0 and said composition is present in said cheese formulation in amounts between about 1 to 3 weight percent of said composition.

6. A process cheese formulation comprising cheese and, as an emulsifier, an admixture comprising between about 0.5 to 1.5 weight percent of said formulation of a sodium material selected from the group consisting of disodium orthophosphate, trisodium orthophosphate, sodium citrate and mixtures thereof, and between about 1.5 to about 2.5 weight percent of said formulation of a substantially amorphous sodium aluminum phosphate composition having the empirical formula $$xNa_2O \cdot yAl_2O_3 \cdot 8P_2O_5 \cdot zH_2O$$

wherein $x$ is a number between 10 and 20 inclusive, $y$ is a number between 4.7 and 10 inclusive, and $z$ is a number between 15 and 30 inclusive, said sodium aluminum phosphate composition characterized by having a soluble fraction of greater than about 35 weight percent of said composition and selected from the group consisting of disodium orthophosphate, trisodium orthophosphate and mixtures thereof, and by the pH of a 2 weight percent aqueous slurry of said composition at about 25° C. being between 7 and 10.

7. The process cheese formulation of claim 6, wherein said sodium aluminum phosphate composition is further characterized by having an insoluble fraction having the empirical formula $$aNa_2O \cdot 3Al_2O_3 \cdot bP_2O_5 \cdot cH_2O$$

wherein $a$ is a number between 0.5 and 5.0 inclusive, $b$ is a number between 0.5 and 2.4 inclusive, and $c$ is a number between 0 and 40 inclusive.

References Cited

UNITED STATES PATENTS 3,097,949   7/1963   Lauck et al. _____ 99—115
3,244,535   4/1966   Lauck et al. _____ 99—117

A. LOUIS MONACELL, *Primary Examiner.*

RAYMOND N. JONES, *Examiner.*

D. M. STEPHENS, S. E. HEYMAN,
*Assistant Examiners.*